United States Patent
Lu

[11] Patent Number: 5,545,040
[45] Date of Patent: Aug. 13, 1996

[54] MULTI-TIER JACK MOTION SYSTEM

[75] Inventor: Youyi Lu, Singapore, Singapore

[73] Assignee: Compacific Engineering Pte Ltd., Singapore, Singapore

[21] Appl. No.: 254,648

[22] Filed: Jun. 8, 1994

[30] Foreign Application Priority Data

Jun. 8, 1993 [GB] United Kingdom .................. 9311848

[51] Int. Cl.⁶ ........................................................ G09B 9/08
[52] U.S. Cl. ................................................ 434/58; 434/29
[58] Field of Search ............................... 434/30, 46, 49, 434/51, 55, 58; 472/59, 60, 130, 136

[56] References Cited

U.S. PATENT DOCUMENTS

| | | | |
|---|---|---|---|
| 3,529,354 | 9/1970 | Roberts et al. | 434/58 |
| 3,557,655 | 5/1971 | Pancoe | 434/58 |
| 4,551,101 | 11/1985 | Neumann. | |
| 4,564,356 | 1/1986 | Winfree | 434/58 |
| 4,576,577 | 3/1986 | Lam et al. | 434/58 |
| 4,753,596 | 6/1988 | Hart et al. | 434/58 |
| 5,009,412 | 4/1991 | Roodenburg et al.. | |
| 5,366,375 | 11/1994 | Sarnicola | 434/29 |
| 5,433,608 | 7/1995 | Murray | 434/30 |
| 5,453,011 | 9/1995 | Feuer et al. | 434/55 |

FOREIGN PATENT DOCUMENTS 8302028  6/1983  WIPO ...................................... 472/60

*Primary Examiner*—Ren Yan
*Attorney, Agent, or Firm*—Merchant, Gould, Smith, Edell, Welter & Schmidt, P.A.

[57] ABSTRACT

A motion generating system for simulator includes a multi-tier assembly of jacks. The multi-tier jacks permit a platform and equipment on the platform to move freely and safely in six degrees of freedom and to a maximum extent permitted by the mechanical properties of the jacks and joints. In the preferred embodiment of the present invention, a two-tier assembly of jacks connects the floor and the platform of a simulator for extending a maximum range in movement of platform and equipment on the platform.

9 Claims, 3 Drawing Sheets

MULTI-TIER JACK MOTION SYSTEM

BACKGROUND OF THE INVENTION

The present invention relates to motion system for simulator, and in particular, to a multi-tier jack motion system for simulating the motion cues in flight or vessel simulators and more recently in similar equipments used in theme/amusement park or sports/entertainment industry.

Simulators are well known in the art for training aircraft pilots without leaving the ground or putting themselves, their instructors or their aircraft at risks. With the advent of high speed digital computers, simulators are also used in the theme park or entertainment industry for simulating high risk activities such as catastrophes or down hill skying. Such non traditional use of simulators is popular because the passengers or users sitting on board of these equipments experience the exhilaration of dramatic motion cues as well as the sensation of gravity forces when the simulators mimic the motion of, for example, a world class down hill skier.

Prior art simulators are designed with aircraft pilot training in mind. As such, the extent of motion cues measured by the degrees of freedom is limited by the design of the motion systems, the weight of the fuselage sections, the instructor's control room and video/audio systems atop the simulator platform.

In general, the motion system of prior art simulators teaches the use of one tier of hydraulic jacks of various configuration to provide motion cues in one or more degrees of freedom. In other words, the jacks connect the base and the underframe of the platform directly and exclusively without other intervening connectors or jacks. U.S. Pat. No. 4,551,101 illustrates a flight simulator which teaches a single tier of three jacks and scissors for supporting a platform having an airplane cockpit and instructor's control room. Similarly, U.S. Pat. No. 5,009,412 shows an earthquake simulator for a theme park having one tier of vertical jacks and a set of horizontal jacks under the platform. Although U.S. Pat. Nos. 4,551,101 and 5,009,412 suggest movement of four, five or six degrees of freedom are possible, the extent of movement beyond three degrees of freedom is restricted by the height limitation in U.S. Pat. No. 4,551,101 and by perpendicular arrangement of the vertical and horizontal jacks in U.S. Pat. No. 5,009,412.

SUMMARY OF THE INVENTION

The present invention describes a motion generating system for simulator having a multi-tier assembly of jacks. The multi-tier jacks permit the platform and equipment on it to move freely and safely in six degrees of freedom and to a maximum extent permitted by the mechanical properties of the jacks and the joints. In the preferred embodiment of the present invention, a two-tier assembly of jacks connects the floor and the platform of a simulator for extending the maximum range in movement of platform and equipment on it.

For a better understanding of the present invention to show how the same may be carried into effect, reference will now be made by way of example to the accompanying drawings, in which:

DETAILED DESCRIPTION OF THE PREFERRED EMBODIMENT

A motion generating system for a simulator having a multi-tier assembly of jacks is described. In the following description, numerous specific details are set forth such as jacks end mounting joints, etc. In order to provide a thorough understanding of the present invention. It will be obvious to one skilled in the art that the present invention may be practised without these specific details. In offer instances, well-known parts such as microprocessor controller and other hydraulic interfaces are not shown in order not to obscure the present invention.

Figure 1:
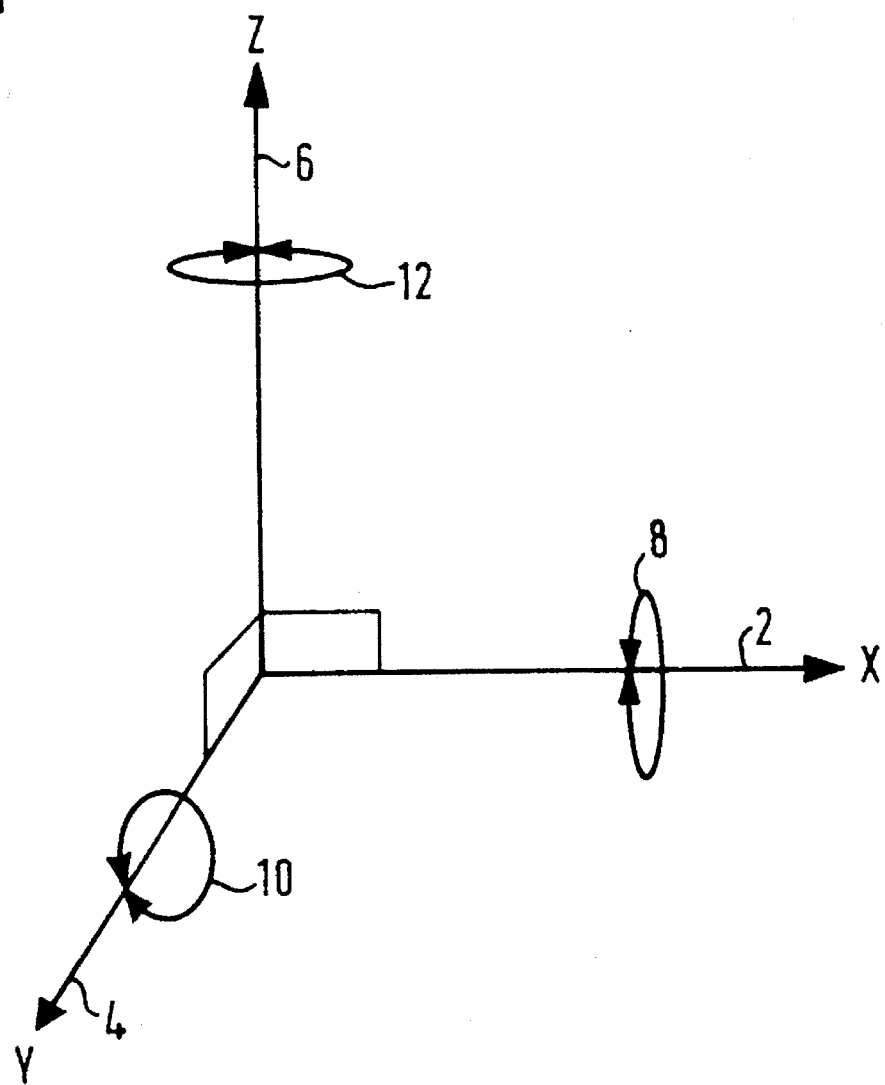
FIG. 1 shows the range of movements having six degrees of freedom in three independent axis x, y and z respectively.

FIG. 1 illustrates coordinate system of at least three axis 2 (x), 4 (z) and 6 (y) respectively. Each of the axis is perpendicular to one another such that they form a three dimensional space. The motion cues generated by motion system of a simulator comprise displacement cues, rotational cues, and a combination thereof. By convention, the displacement cues along axis 2 are called surge; those along axis 4 are called sway; and those along axis 6 are called heave. At the same time, the rotational cues about each of the three axis are roll 8, pitch 10 and yaw 12. Together the three displacement cues and three rotational cues comprise the six degrees of freedom.

In general, the motion systems of prior art simulators teach the use of one tier of hydraulic jacks to provide motion cues in one or more degrees of freedom. In other words, the jacks connect the floor and the underframe of the platform directly and exclusively without other intervening connectors or jacks. U.S. Pat. No. 4,551,101 illustrates a flight simulator which teaches a single tier of three jacks and scissors for supporting a platform having an airplane cockpit and instructor's control room. Similarly, U.S. Pat. No. 5,009,412 shows an earthquake simulator for a theme park one tier of vertical jacks and a set of horizontal jacks under the platform. Although U.S. Pat. Nos. 4,551,101 and 5,009, 412 suggest movement of four, five or six degrees of freedom, the extent of movement beyond the three displacement cues—surge, sway and heave—is limited. Above all, the rotational cues and the combination of rotational cues and displacement cues of prior art simulators are similarly restricted. As such, the motion cues of an aircraft flying through a severe storm or a sky jumper taking off from a 100 meter sky jump may not be simulated realistically in prior art simulators notwithstanding the availability of sophisticated video and audio accessories on board such simulators.

The present invention describes a motion generating system for a simulator having a multi-tier assembly of jacks. The multi-tier jacks permit the platform and equipment on it to move freely and safely in six degrees of freedom and to a maximum extent permitted by the mechanical properties of the jacks and the joints. In the preferred embodiment of the present invention, a two-tier assembly of jacks connects the base and the platform of a simulator for extending the maximum range in movement of platform and equipment attached thereto.

Figure 2:
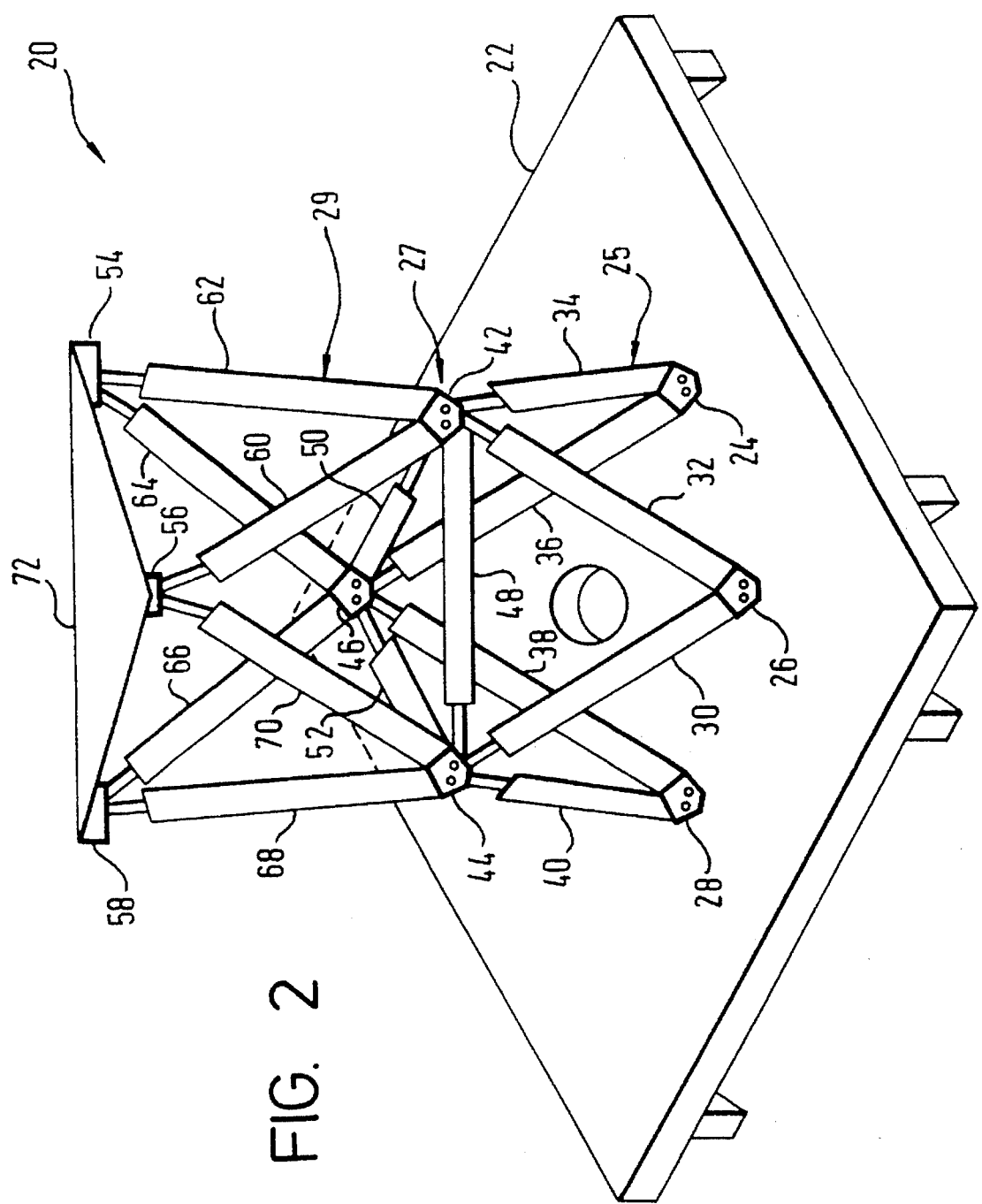
FIG. 2 illustrates a two-tier embodiment of the present invention which is at rest.

FIG. 2 illustrates a two-tier embodiment of a motion system for a simulator, Here, the multi-tier motion system 20 is shown at rest, i.e., the platform 72 is substantially level with the floor 22. The multi-tier motion system 20 comprises a floor 22 placed on the ground; a first tier of jacks 25; an intermediate tier of joints 27; a second tier of jacks 29; and a platform 72. it should be understood by one skilled in the art that should each of the jacks be of equal length, none of the jacks is extended when the multi-tier motion system 20 is at rest.

The first tier of jacks 25 comprise an assembly of mounting joints 24, 26, and 28 for anchoring the multi-tier jacks onto the floor 22 and at most six first tier jacks 30, 32, 34, 36, 38 and 40. The intermediate tier of joints 27 comprise universal joints 42, 44 and 46 and at least three intermediate jacks 48, 50 and 52. The second tier jacks 29 features jacks 60, 62, 64, 66, 68 and 70 as well as an assembly of platform mounting joints 54, 56 and 58.

Referring again to FIG. 2, each of the mounting joints 26, 28 and 30 are coupled to one end of at least two first jacks. For example, the mounting joint 26 is coupled to one end of jacks 30 and 32. The other end of jacks 30 and 32 are in turn coupled to two different intermediate joints 42 and 44 respectively. At the same time, the intermediate joints 42 and 44 are interconnected with the intermediate jack 48. Therefore, the mounting joint 26 and the intermediate joints 42 and 44 forms a triangle which is well known as a stable configuration or shape. Likewise, the same construction applies for the other mounting joints and intermediate joints. In the preferred embodiment of the present invention, the intermediate joints consist of universal joints.

By jack the present invention contemplates among many alternative either a hydraulic, pneumatic, electrical or even mechanical (for example, worm type) jack. It should also be understood by one skilled in the art that a system (not shown) is coupled to the motion system 20 for extending or retracting the jacks as and when the circumstances required. For instance, if the jacks were hydraulically actuated, a system of hydraulic fluids is coupled with each of the jacks. It is also contemplated that a computer based controller (not shown) is coupled to the motion system 20 for actuating the multi-tier jacks. Neither of the system for actuating the jacks nor the controller is shown in order not to obscure the presentation of the present invention.

In FIG. 2 the intermediate joints 42, 44 and 46 are not only coupled with the one end of the first tier of jacks 25, but are also interconnected with jacks 48, 50 and 52 for stabilizing the multi-tier jack motion system 20. Additionally, the intermediate joints 27 are each further coupled to one end of at least two other jacks from the second tier of jacks 29. For instance, the universal joint 46 is coupled to one end of the second tier jacks 64 and 66 respectively. Similarly, the other end of the second tier jacks 64 and 66 are coupled to two different platform mounting joints 54 and 58. It should be clear to one skilled in the art that once again the universal joint 46 and platform mounting joints 54 and 58 form a triangle configuration or shape. The same configuration applies for the other joints in the second tier jacks. It follows that the second tier jacks are coupled to the underframe of the platform 72 via the platform mounting joints 54, 56 and 58. Thus, two-tier motion system 20 extends any simulator's motion cues beyond what is possible with a single tier jack motion system. The functions of the multi-tier jack motion system 20 will be further illustrated in connection with the description of FIG. 3 below.

Figure 3:
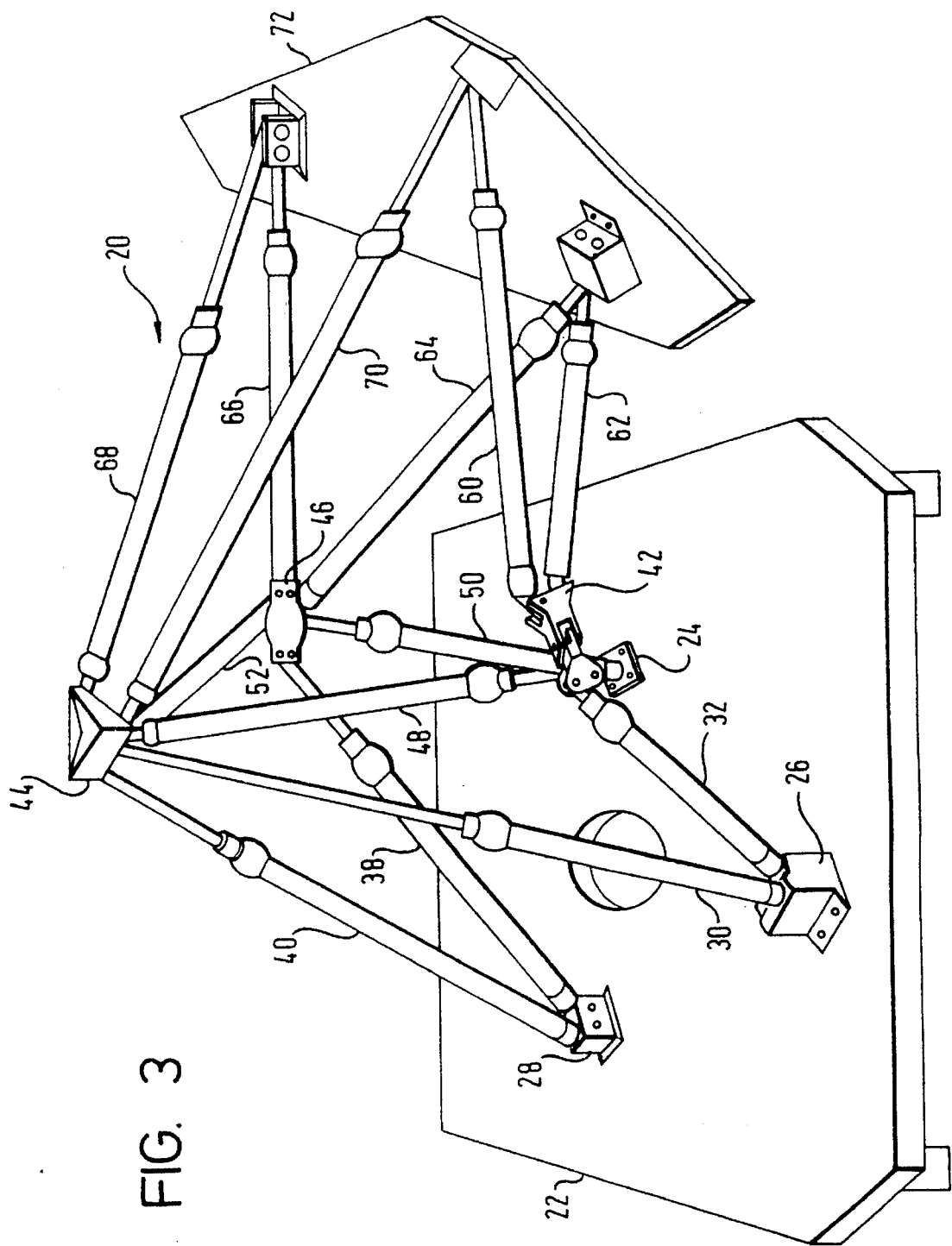
FIG. 3 illustrates the two-tier embodiment of the present invention as shown in FIG. 2 but at a position which is not possible with prior art motion system for simulator.

FIG. 3 illustrates the two-tier motion system as in FIG. 2 but with motion cues which is not possible with prior art simulators employing single tier motion systems. Motion system 20 has its platform 72 extended beyond the vertical space of the floor 22. This motion cue is possible as the first tier jack 30 and 40 are fully extended, while the first tier jacks 32 and 38 are extended about half the length of the jack's maximum extension. At the same time, the first tier jacks 34 (obscured by intermediate jack 42) and 36 (obscured by jack 50) are not extended. Meanwhile, the intermediate joints 42, 44 and 46 and the intermediate jacks 48, 50 and 52 provides the support to stabilize the motion system 20 in FIG. 3. Similarly, the second tier jacks 68 and 70 are extended fully while the offer second tier jacks 60 and 66 are extended substantially half the maximum extension to produce a motion cue of the platform that hitherto was not feasible in prior art simulators. Finally the second tier jacks 62 and 64 are unextended to support the platform 72.

While the present invention has been described particularly with reference to FIGS. 1 to 3 with emphasis on a motion generating system for a simulator having a multi-tier assembly of jacks, it should be understood that the figures are for illustration only and should not be taken a limitation on the invention. In addition, it is clear that the method and apparatus of the present invention has utility in many applications where motion generation machine is required. It is contemplated that many changes and modifications may be made by one of ordinary skill in the art without departing from the spirit end the scope of the invention as described.

I claim:

1. A system for generating motion for a simulator having a floor and a platform, said system comprising:

a first tier of jacks;

at least three mounting joints on said floor, each mounting joint coupling one end of two of said first tier of jacks;

a second tier of jacks;

at least three intermediate joints, each intermediate joint coupling the other end of two of said first tier of jacks and two of said second tier of jacks, each of said intermediate joints being coupled to at least two of said mounting joints by said first tier of jacks;

a plurality of intermediate jacks, each of said intermediate joints being further interconnected with each other via one of said intermediate jacks; and at least three platform mounting joints on said platform for coupling to said intermediate joints by said second tier of jacks, each of said platform mounting joints being coupled to at least two intermediate joints by said second tier of jacks, such that the platform and equipment attached on an upper surface of said platform moves in six degrees of freedom.

2. A system according to claim 1, wherein said first tier of jacks comprises six jacks, two of which are coupled to each of said mounting joints.

3. A system according to claim 1, wherein said second tier of jacks comprises six jacks, two of which are coupled to one of said platform mounting joints.

4. A system according to claim 1, wherein said intermediate jacks comprise three jacks, both ends of each are coupled to separate intermediate joints.

5. A system according to claim 4, wherein said intermediate jacks, said first and second tiers of jacks are hydraulically actuated.

6. A system according to claim 4, wherein said intermediate jacks, said first and second tiers of jacks are pneumatically actuated.

7. A system according to claim 4, wherein said intermediate jacks, said first and second tiers of jacks are electrically actuated.

8. A system according to claim 4, wherein said intermediate jacks, said first and second tiers of jacks are mechanically actuated.

9. A system according to claim 1, wherein said intermediate joints comprises three universal joints.

* * * * *